June 25, 1935.  J. H. STARK ET AL  2,006,321
DEMAND METER
Filed June 20, 1934
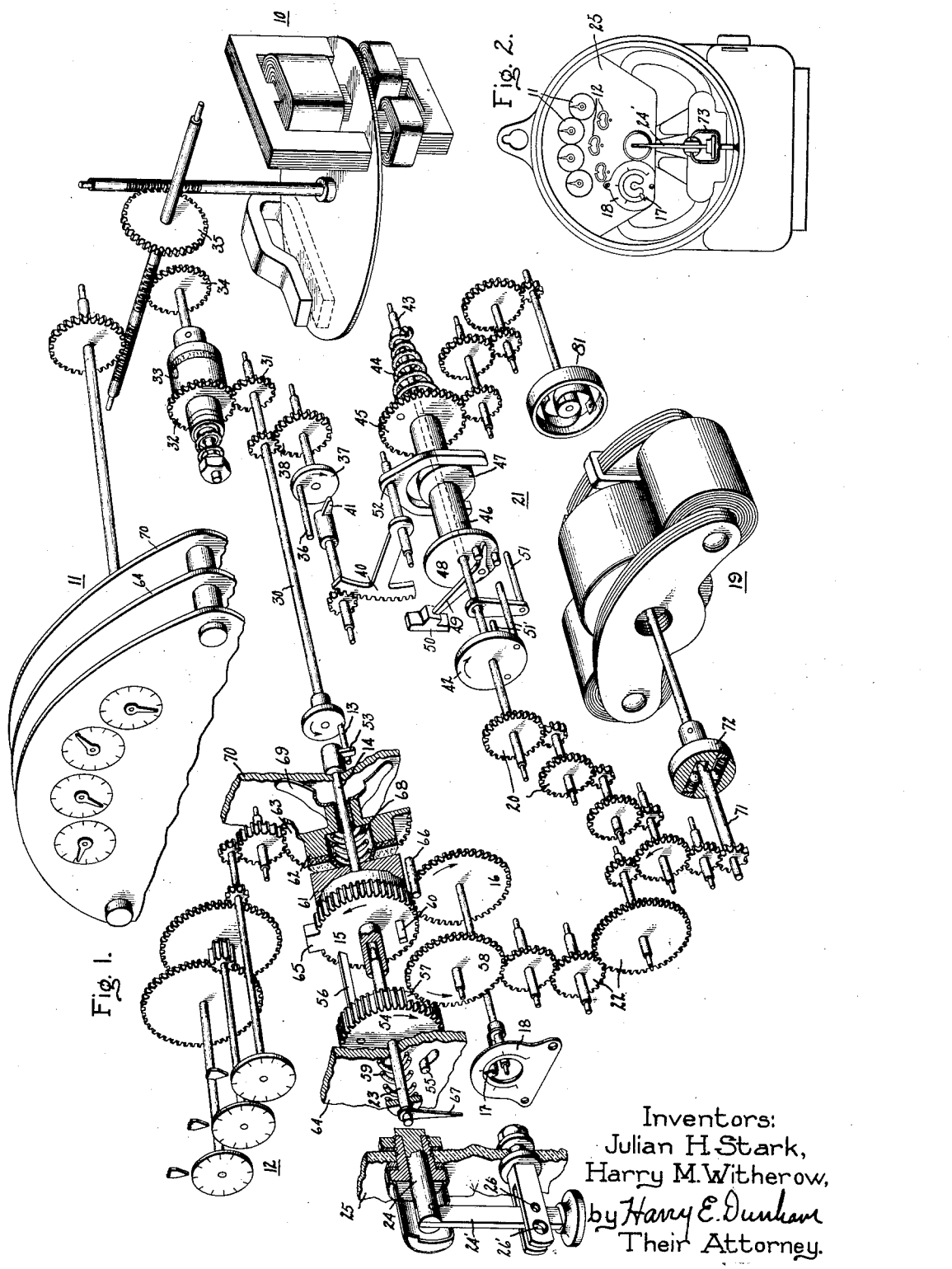
Inventors:
Julian H. Stark,
Harry M. Witherow,
by Harry E. Dunham
Their Attorney.

Patented June 25, 1935

2,006,321

UNITED STATES PATENT OFFICE 2,006,321

DEMAND METER

Julian H. Stark and Harry M. Witherow, Fort Wayne, Ind., assignors to General Electric Company, a corporation of New York Application June 20, 1934, Serial No. 731,573

13 Claims. (Cl. 171—94)

Our invention relates to demand meters and has for its object improvements in this type of device, particularly with respect to the manner in which the demand is registered and with respect to resetting the parts which measure maximum demand.

In a well known form of demand meter, a dog is advanced during demand intervals, such as half hour intervals, in accordance with the measurement of some quantity such as electric energy and is automatically reset to a zero position at the end of each such interval. In its advance, the dog may come against a friction pointer and move the latter up scale. At the end of a period of time, such as a month, the position of the friction pointer with respect to the scale indicates the maximum demand which has occurred in any one of the half hour intervals during the month and this measurement is taken into consideration in calculating rate charges for the month. The friction pointer is then reset to the zero end of the scale by hand by the meter reader after he has taken the maximum demand reading.

There are some features about such a demand meter to which objections have been raised. In the first place, as soon as the meter reader has taken the demand reading and reset the demand-indicating pointer back to zero, the reading is destroyed and the accuracy of the montly bill depends solely on the honesty and accuracy of the meter reader. If there is a dispute about the maximum-demand reading, it cannot be checked except by what appears in the meter reader's notebook.

One object of our invention is to provide a demand meter in which the maximum demand is registered with a higher degree of accuracy than is possible with the ordinary friction pointer and scale.

Another object of our invention is to provide a demand meter in which the maximum-demand reading is not destroyed by the meter reader at the time he takes his reading and conditions the device for the next month's demand measurement. Instead, we provide a meter having a summation demand register which is advanced at the time the demand reading is taken and which shows this reading during the ensuing month so that, if there is a dispute in the bill, the demand reading can be checked. Moreover, we provide a monthly resetting arrangement which cannot be tampered with by a dishonest meter reader to increase or decrease the demand reading. The meter reader merely initiates the resetting operation without opening the meter case and the resetting operation and simultaneous advance of the summation demand register is performed by a small motor in the demand meter, which motor is preferably the same one that is used to establish the demand intervals. The resetting operation and the forces involved therein are always the same and the mechanism is not subject to the abuse incident to the manual resetting of these delicate parts.

The features of our invention which are believed to be novel and patentable will be pointed out in the claims appended hereto. For a better understanding of our invention, reference is made in the following description to the accompanying drawing showing, in Fig. 1, an exploded view of a preferred form of mechanism for carrying out our invention; and Fig. 2 shows a face view of a commercial form of meter equipped with our invention.

Before proceeding with a description of the details, a general description of the main parts of the mechanism shown in Fig. 1 will be helpful. At 10, we have represented an ordinary form of induction watt-hour meter such as those used to measure the electric energy consumed by a customer. The amount paid by the customer is based upon the amount of electric energy used, as shown by the meter reading from month to month, and, where the amount of electric energy used is of an appreciable amount, it is customary to charge a higher or lower rate, depending upon the maximum demand as measured by a demand meter. The register shown at 11, which is geared directly to the meter 10, shows the total amount of electric energy used, and the remainder of the apparatus constitutes a maximum-demand meter in which our invention is incorporated. The maximum demand is obtained from the dials 12 by subtracting from the reading for the present month that for the previous month, assuming readings and bills are on a monthly basis. This register 12 remains stationary between the monthly readings, whereas register 11 is advanced continuously in accordance with the rotation of meter 10.

It will be assumed that the predetermined demand interval of this meter is thirty minutes although it may be anything desired. The demand-interval dog or member which is advanced in accordance with the measurement of meter 10 and which is reset to a zero position every thirty minutes, is represented at 13. The part which is advanced in accordance with the maximum rotation of dog 13 from a zero position in any one of the many thirty-minute intervals during a month is the shaft 14 together with gears 15 and 16 and pointer 17. Pointer 17 thus corresponds to the usual friction pointer of previous demand meters and the approximate demand, as shown by this pointer, is preferably indicated on a scale 18. 19 is a timing motor which operates through gear train 20 and timing interval mechanism 21 to reset dog 13 to a zero position every thirty minutes. The same timing motor 19 operates through a gear train 22 to reset shaft 14 to a zero position and simultaneously advance the accumulative demand register 12 at the end of each month when the meter reader presses a shaft 23 axially inward to establish certain driving connections hereinafter explained.

The meter reader does not open the meter casing to initiate this resetting operation, but rather uses a pin 24 which extends through a weatherproof bushing in the front glass cover 25 of the meter. The pin 24 is ordinarily sealed or locked in an inoperative condition by securing the hinged part 24' by a seal or lock at hole 26 or 26'. The different registers and pointers are arranged to be read through the front glass cover of the meter, as indicated in Fig. 2.

Having outlined the main parts of the apparatus, we will now give a more detailed description of the parts and their operative relation. The interval demand member or dog 13 is advanced in the direction of the arrow through the shaft 30, gears 31 and 32, a friction clutch 33, and gears 34 and 35, from the meter 10. During this advance, a pin 36 in a disc 37 is rotated in the direction indicated thereon through gears 38. At the end of the thirty-minute interval, a rack 40 of the timing interval mechanism is reciprocated up and down and, in so doing, rotates an arm 41, first in a counterclockwise direction and then back again through part of a revolution. During the first half of this reciprocating movement, arm 41 comes against pin 36 and moves it counterclockwise to a zero position and, at the same time, dog 13 is moved clockwise to a zero position, the friction clutch at 33 permitting this resetting operation. The return movement of arm 41 to the position shown brings it out of the way and allows the free advance of pin 36 in a clockwise direction towards arm 41 during the next demand interval.

The timing interval mechanism 21 which is driven by timing motor 19 through gear train 20 will next be explained. The disc at 42 is driven from the gear train 20 at a constant speed in a clockwise direction at one revolution in thirty minutes and, in so doing, it drives a shaft 43 and winds up a spring 44. Spring 44 has one end secured in driving relation with shaft 43 and the other end secured to a gear 45. Gear 45 is secured to a hollow shaft 46 on which is mounted an eccentric 47 and a disc 48, all free to turn as a unit on shaft 43. However, the hollow shaft 46 and the parts carried thereby are normally blocked from rotation in a clockwise direction as urged by spring 44 because of a stop arm 49 pivoted on the side of disc 48 and resting on a stop plate 50. Once during each revolution of disc 42, a finger 51, which rotates with shaft 43 with a slight lost motion permitted by play between pins 51', comes against the outer underside of stop arm 49, moves it upward and off of stop plate 50, and releases the hollow shaft 46, allowing it to rotate a complete revolution under the tension of spring 44 at which time the stop arm 49 is again brought against stop plate 50 and prevents further rotation until another thirty-minute interval has passed. A second governor 81 is geared to gear 45 to limit the speed of and the shock of stopping the rotation of hollow shaft 46 and the parts carried thereby. Thus, periodically, once every thirty minutes, which is the demand interval selected, eccentric 47 makes one complete revolution in about one second and, in so doing, oscillates the follower 52 and rack 40 which is connected to the follower. In this way, the dog 13 is quickly and accurately returned to a zero position every thirty minutes.

During the advance of dog 13, it will come against an arm 53 projecting from shaft 14 if this arm is not already in a position beyond which the dog 13 is advanced during any given demand interval and which, when advanced, rotates shaft 14, gears 15 and 16, and pointer 17 up scale. When the dog 13 is reset to zero, the parts connected between shaft 14 and pointer 17 ordinarily remain in the advanced position. As a result, the position of these parts will represent a measurement of the thirty-minute interval maximum demand over any desired period of time, such as a month. At the end of the month or at the end of such other period when the meter readings are taken, the meter reader records the readings of dials 11 and 12 and it is then desirable to reset the parts corresponding to the maximum demand to a zero position. These are the parts 53, 14, 15, 16, and 17, and, in order to do this, the dog 13 must likewise be reset to zero with arm 53 in contact therewith. To do this, the seal 73 in opening 26 (shown in Fig. 2) is removed, part 24' is raised until it is in line with pin 24 and then it is pushed inward against the end of shaft 23 which is telescoped into the end of shaft 14. Shaft 23 carries a gear 54 which is fastened thereon and which has a front pin 55 normally resting in a short slot in the stationary plate 64 of the meter and a rear pin 56 projecting part way towards gear 15. Gear 54 has a small portion 57 on its inner periphery where the teeth are cut away and, in the position shown, the continuously-rotating gear 58 driven from the timing motor 19, in the direction indicated by the arrow, is prevented from driving gear 54 by reason of the mutilated portion 57 of this gear.

Gear 54 is normally retained in the axial position shown, out of mesh with gear 58, by a spring 59 which is under compression between a collar on the outer end of shaft 23 and the plate 64 which rotatively supports this shaft. However, when the pin 24 is pushed inward, shaft 23 and the parts thereon are moved in an axial direction to remove pin 55 from its slot, to mesh the gears 54 and 58, and to move pin 56 towards gear 15 and into the path of rotation of a pin 60 on the front face of gear 15. This endwise movement of shaft 23 also causes its rear pointed end to engage the inner end of the recess in the forward end of shaft 14 and shaft 14 and gear 15 are moved endwise in the same direction by a lesser amount but sufficient to engage a friction clutch, one part 61 of which is on the rear face of gear 15 and the other part 62 of which is on a gear member 63 in driving engagement with the accumulative demand register 12.

Continuously-rotating gear 58 is now in driving engagement with gear 54 and the latter starts to rotate in the direction indicated by the arrow. The pin 24 may and should now be withdrawn for, as soon as there is any appreciable rotation of gear 54, its pin 55 no longer registers with its slot but bears against the inner face of plate 64 and holds gear 54 and the other parts, which have been moved to the rear in an axial direction, from returning until gear 54 has made substantially a complete revolution and pin 55 again registers with its slot in plate 64, at which time, the pin 24 having been withdrawn, gear 54 moves endwise and the driving connection between gears 54 and 58 is broken due to the mutilated portion 57 of gear 54 again registering with gear 58. As gear 54 and the pin 56 projecting from its rear surface rotate in a clockwise direction one revolution, gear 15 is not driven therewith until or unless pin 56 engages with pin 60. These pins will engage during this operation unless gear 15 is in a zero demand-indicating position and, if not in this position, the operation will drive gear 15 and the parts which are connected thereto to a zero demand-indicating position which is the position where pin 55 registers with the forward end of the slot in plate 64 and gear 54 is about to be disengaged from gear 58. Also, this zero demand-indicating position is where the pointer 17 is at the zero end of its scale 18. The idle position of gear 54 is indicated by a pointer 67 on the outer end of shaft 23 and is in view of the meter reader and from which he may ascertain when the resetting operation starts and when completed.

When gear 15 is driven to a zero-indicating position or reset by energy received from the timing motor 19, the dog 13, shaft 30, gears 31, 32, and 38, and the disc 37 with its pin 36 will also be driven to a zero position if they do not happen to be in such position. This is permitted by the friction clutch at 33. Both resetting operations are performed by energy received from the timing motor 19. In the case of the demand-interval reset, the energy is first stored in the spring 44 and released at intervals and, in the case of the maximum-demand-interval reset, through gear train 22, the energy being received directed from motor 19. The two mechanisms are sufficiently independent, however, that they may perform their resetting operations at the same or different times without interference.

When the maximum-demand-interval reset, which is initiated by the meter reader, occurs, it was pointed out above that the parts 61 and 62 of the friction clutch between gear 15 and the accumulative demand register 12 were in engagement and, as a result, the maximum-demand measurement, corresponding to the amount gear 15 and pointer 17 are reset is registered on the dial type register 12 and is added to any previous amount which this register indicated. After the maximum-demand reset has occurred, register 12 is read again and the exact maximum demand for the previous month is obtained by subtracting the reading before reset from the reading after reset. The result should correspond to what was indicated by the pointer 17 on the scale 18 prior to the resetting operation although it is possible to read the register 12 with a greater degree of accuracy. The indication given by pointer 17 before reset thus serves as a check on the proper operation of the resetting mechanism.

A spring 68 assures that the friction clutch parts 61 and 62 will be disengaged as soon as this is permitted by the registration of pin 55 with its slot in plate 64 at the end of this resetting operation, and a friction member 69 is preferably secured between gear 63 and plate 70 to prevent overshooting and accidental rotary movements of the rotating parts of dial mechanism 12 except as positively driven in a resetting operation. The reason for providing a short slot instead of merely a round hole in plate 64 for the reception of pin 55 is to permit sufficient rotation of gear 54 when in the axial position shown for pin 56 to pass pin 60 after pin 60 has been driven to its zero position immediately following a resetting operation and the pins are of such length that this is possible when gear 54 is in the position shown, moved away from gear 15. In actual practice, the parts 54, 61, 62, and 63 are much more closely spaced and the pins 56 and 60 are very much shorter than here represented. In fact, although distorted in the illustration, the plates 64 and 70 are the central and back plates of the main meter register 11.

A safety stop 66 is preferably provided against which a projection 65 in gear 15 will be driven in case the parts do not disengage at the zero position. This stop arrangement consisting of pin 66 and projection 65 is merely a safety arrangement and ordinarily when the parts are returned to zero, projection 65 does not quite reach stop pin 66. However, if something should go wrong with the declutching operation such as would tend to drive the gear 15 and register 12 continuously, the projection 65 comes against stop pin 66 and stalls the timing motor. This is preferable to destroying the accumulated record and possibly causing damage to some delicate part of the mechanism.

As illustrated, the maximum-demand-measurement parts connected with gear 15 are shown to be advanced from a zero position over about one-half of their complete range of movement. Likewise, the interval-demand dog 13 and parts connected thereto are shown advanced from a zero position in about the same proportion, the demand-interval mechanism 21 will trip in about ten minutes assuming a thirty-minute interval since pin 51 has completed about two-thirds of a revolution towards the releasing position adjacent stop plate 50.

It will be assumed that the timing motor is a synchronous timing motor and that its terminal shaft 71 makes one revolution per minute. The gear train 20 is then a speed-reducing train of 30 to 1. We have found it practicable and convenient to have the gear 54 make one revolution in about one minute when a maximum-demand-resetting operation is performed and the gear drive between the terminal shaft 71 and gear 54 may, therefore, have a 1 to 1 ratio although this is not essential. We also prefer to provide an overrunning clutch 72 between the timing motor and gear trains to facilitate testing of the device in the factory and at other times as desired. This overrunning clutch simply allows the motor to drive the gear train in the usual way and also allows the gear train to be run in the same direction as before without running the motor, or at a faster rate than it would be driven by the motor if the latter is running. When the meter is removed from its casing, gear trains 22 and 20 may be manually advanced to test out the maximum-demand-resetting operation.

Having described the mechanism, it may be helpful to briefly review a resetting operation of the maximum-demand apparatus as initiated by a meter reader. The meter reader first takes down the readings of dials 11 and 12, notes the reading of pointer 17 and records it also if required. He then removes the seal 73 (Fig. 2), raises the hinged part 24' until in line with pin 24, and presses gently inward until he sees pin 67 start to rotate. He then withdraws pin 24, turns part 24' down to the locking position, and seals it in place. By that time, he notes that pointer 67 has completed its revolution and pointer 17 has returned to zero and he takes down the new reading of register 12. The difference in the two readings of register 12 should check approximately with the initial reading on dial 17.

As soon as the operation is initiated by movement of shaft 23 to the rear, the following operations take place. Gear 54 meshes with gear 58 and is driven in a clockwise direction, pin 55 bears against the inner side of plate 64 and holds the shaft 23 and the other parts which are axially displaced to the rear in their axially-displaced positions until the resetting operation has been completed. Gear 15 is also moved axially to the rear to engage the clutch parts 61 and 62 but this movement is somewhat less than the axial movement of shaft 23. Gear 15 and the parts including register 12 do not rotate until pin 56 comes against pin 60, after which all of these parts are driven to a zero position. At the same time that gear 15 reaches the zero position, pin 55 registers with its slot in plate 64 and gear 54 is moved axially to the front, disengaging pin 56 from pin 60 and disengaging clutch parts 61 and 62. Gear 54 is then driven a very small distance further before losing its driving connection with gear 58. This causes gear 54 to rotate the small amount permitted by the slot in which pin 55 is now received and this carries pin 56 beyond pin 60 ready for another resetting operation, even though pin 60 remains in its zero position.

Aside from the greater accuracy of reading the maximum demand with the accumulative register 12, the registration of maximum demand in this way has certain advantages which may be exemplified by considering a few typical readings taken from the register 12 as they might appear in the meter reader's book, thus—

| Meter register 11 | Demand register 12 | | Maximum demand for past month |
|---|---|---|---|
| | Before resetting | After resetting | |
| Jan. 1 | 284 | 313 | 29 |
| Feb. 1 | 313 | 361 | 48 |
| Mar. 1 | 361 | 401 | 40 |
| Apr. 1 | 401 | 454 | 53 |

It will be observed that the reading of the register 12 remains unchanged during the month between meter readings and maximum-demand-resetting operations. This provides a check by means of which the meter reader can see at a glance if the previous record was correctly taken down or if the register 12 has been changed by some unauthorized person during the month. There is little danger of a dishonest meter reader's turning in faked readings as each reading is available for checking for a whole month by the power company and by the customer. For the same reason, a dispute as to the correctness of the maximum-demand reading on which a bill is based may be readily checked prior to the time the customer would ordinarily pay such bill. Since the maximum-demand reset is not performed manually, the difficulties that arise incident to the manual adjustment of delicate mechanisms by unskilled persons are avoided and the operation is less dependent upon human judgment.

In this form of demand meter, the person who initiates the maximum-demand-resetting operation does not need to open the meter. Nevertheless, he must be an authorized meter reader as the pin 24 cannot be pushed in until the seal at 26 is removed and the part 24' is raised because, when this is down in the position shown in Fig. 1, pin 24 is locked from movement in either direction, and where it also blocks the opening in the meter cover so that no other pin can be inserted.

Although we have described the invention in connection with the measurement of electric energy, it will be evident that, so far as the invention is concerned, gear 34 might be driven by or otherwise advanced in accordance with any device, the maximum demand of which it is desired to investigate. Since the timing interval mechanism 21 performs its operation quite independently of the maximum-demand-reset mechanism, the former need not be of the type herein described nor is it essential that the power used to reset the maximum-demand mechanism be obtained from the existing timing motor although this is highly desirable when it is appreciated that all of the parts including the watt-hour meter 10 are intended to be contained within a meter casing of the usual house type size as indicated in Fig. 2.

What we claim as new and desire to secure by Letters Patent in the United States is:

1. A demand meter comprising an interval-demand member which is advanced over predetermined intervals of time in accordance with a measurement and periodically reset to a zero position at the end of such intervals, a maximum-demand part which is advanced from a zero position in accordance with the maximum advance of the interval-demand member over many of said time intervals, and means for setting the maximum-demand part to a zero position comprising a motor, a normally-disengaged driving connection between said motor and part, manually-controlled means for establishing said driving connection to initiate a resetting operation, and means for automatically interrupting said driving connection when such resetting operation has been completed.

2. A demand meter comprising a demand-interval member which is advanced from a zero position over predetermined intervals of time in accordance with a measurement and reset to such zero position at the end of said time intervals, a maximum-demand part which is advanced from a zero position in accordance with the maximum advance of the interval member over many of said time intervals, and means for resetting said maximum-demand part to its zero position comprising a motor-operated gear, a second gear normally disengaged from the motor operated gear, manual means for initially engaging said gears, means for automatically disengaging said gears after the normally-disengaged gear has made one revolution, and means driven by said last mentioned gear during such revolution for driving said maximum-demand part to its zero position.

3. A demand meter comprising an interval-demand member which is periodically advanced from a zero position in accordance with a measurement and returned to its zero position at the end of predetermined time intervals, a maximum-demand part which is advanced from a zero position in accordance with the maximum advance of said interval member over many of said time intervals, and means for returning said maximum-demand part to its zero position comprising a normally-stationary gear, a normally-driven gear, manual means for moving the normally-stationary gear in an axial direction to driving engagement with the normally-driven gear, means for retaining said gears in such engagement while the normally-stationary gear makes one complete revolution and then automatically disengaging said gears by a reverse axial movement of the normally-stationary gear, and means operated by the normally-stationary gear during such revolution for driving said maximum-demand part to a zero position.

4. A demand meter comprising an interval-demand member advanced from a zero position over predetermined time intervals in response to a measurement, a timing motor and means operated by said motor for returning said demand member to its zero position at the end of each such time interval, a maximum-demand part which is advanced from a zero position in accordance with the maximum advance of the interval-demand member over many time intervals, and manually-controlled means operated by said timing motor for driving said maximum-demand part to its zero position.

5. A demand meter having a periodically reset dog which is advanced in accordance with a measurement and automatically returned to a zero position at predetermined time intervals, a maximum-demand part which is advanced from a zero position in accordance with the maximum advance of said dog over many of said time intervals, and a motor for establishing said time intervals and for returning said dog and said maximum-demand parts to their zero positions, and manually-operated means for initiating the return of said maximum-demand member to its zero position by said timing motor.

6. A demand meter comprising an interval-demand member which is advanced from a zero position over predetermined time intervals in accordance with a measurement, a maximum-demand part which is advanced from a zero position in accordance with the maximum advance of the interval-demand member over many such time intervals, means for automatically returning the interval-demand part to its zero position at the end of each of the predetermined intervals, means controlled manually for returning the maximum-demand part to its zero position when desired, and a common timing motor for operating both of said zero-returning means.

7. A maximum-demand meter comprising an interval-demand member which is advanced from a zero position in accordance with a measurement over predetermined time intervals and reset to a zero position at the end of such time intervals, a maximum-demand part which is advanced from a zero position in accordance with the maximum advance of the interval-demand member over many time intervals, a normally-idle accumulating register, a constantly-operating motor and manually-controlled means for establishing a driving connection between said maximum-demand part, said register and said motor for returning the maximum-demand part to its zero position and registering the maximum demand measured thereby on said register.

8. A demand meter comprising an interval-demand member which is advanced from a zero position in accordance with a measurement and returned to its zero position at the end of predetermined time intervals, a maximum-demand part which is advanced from a zero position in accordance with the maximum advance of the interval-demand member over many of such time intervals, a constantly-operating timing motor for establishing said time intervals, a normally-idle accumulating register and manually-controlled means for establishing a driving connection between said maximum-demand part, said accumulating register and said timing motor for returning the maximum-demand part to its zero position and registering the maximum demand measured thereby on said register, and means for thereafter automatically interrupting said driving connection.

9. In a maximum-demand meter, a rotatively-mounted maximum-demand-measuring part which is advanced from a zero position in accordance with the maximum demand as measured over many time intervals, a normally-stationary rotary member in axial alignment with said demand-measuring part, said demand-measuring part and said normally-stationary rotary member being movable axially, a constantly-rotating member adjacent said normally-stationary rotary part, an accumulating register having a driving member closely associated with said demand-measuring part, resilient means normally retaining said demand-measuring part, said normally-stationary part, said constantly-rotating member, and said register-driving member out of driving relation with each other, and manually-operated means for momentarily axially displacing said normally-stationary part and said demand-measuring part to establish driving connections between them and with said closely associated members for returning said demand-measuring part to a zero position and for adding its measurement to said register, and resilient means for returning the axially-displaced parts to their original positions as soon as said operations are completed.

10. A sealed casing, a demand meter therein comprising a maximum-demand-measuring part, interval-demand-measuring means for positioning said part away from a zero-measurement position in accordance with maximum demand as measured over many equal time intervals, normally-inactive motor-operated means for automatically resetting said maximum-demand-measuring part to its zero position, a pin extending through a wall of said casing, said pin having a limited endwise movement for initiating such resetting operation, and means external to said casing for sealing said pin in a condition where it cannot be used to initiate such resetting operation.

11. A sealed casing, a demand meter contained within said casing including a maximum-demand-measuring part which is moved away from a zero position in accordance with the maximum demand as measured over a plurality of equal time intervals, a constantly-operating motor for establishing said time intervals, a normally-inactive accumulative register, normally-disengaged driving connections between said maximum-demand-measuring part, said motor and said register which when established causes said motor to return the maximum-demand-measuring part to a zero position and to add its measurement to said register and thereafter interrupting said driving connections, a pin extending through a wall of said casing movable from a first position to a second position to establish said driving connections, and means external to said casing for sealing said pin in the first mentioned position.

12. A demand meter comprising an interval-demand member which is advanced from a zero position in accordance with a measurement over predetermined intervals of time and reset to its zero position at the end of such intervals, a maximum-demand-measuring part which is advanced from a zero position in accordance with the maximum demand of the interval-demand member over many of such time intervals, a timing motor and means driven thereby for automatically returning said interval-demand member to a zero position at the ends of said predetermined time intervals, manually-controlled means driven by said motor for returning said maximum-demand part to its zero position when desired, and an overrunning clutch between said motor and the above mentioned parts which are driven thereby, whereby the parts normally driven by said motor may be operated manually, independently of said motor.

JULIAN H. STARK.
HARRY M. WITHEROW.